(12) United States Patent
Yamamoto et al.

(10) Patent No.: US 10,365,628 B2
(45) Date of Patent: Jul. 30, 2019

(54) POSITIONING CONTROL DEVICE OF ACTUATOR PROVIDED WITH STRAIN WAVE GEARING USING H-∞ CONTROL

(71) Applicants: HARMONIC DRIVE SYSTEMS INC., Shinagawa-ku, Tokyo (JP); NAGOYA INSTITUTE OF TECHNOLOGY, Nagoya-shi, Aichi (JP)

(72) Inventors: Masafumi Yamamoto, Azumino (JP); Yoshifumi Okitsu, Azumino (JP); Makoto Iwasaki, Nagoya (JP)

(73) Assignees: Harmonic Drive Systems Inc., Shinagawa-ku, Tokyo (JP); Nagoya Institute of Technology, Nagoya-shi, Aichi (JP)

( * ) Notice: Subject to any disclaimer, the term of this patent is extended or adjusted under 35 U.S.C. 154(b) by 85 days.

(21) Appl. No.: 15/553,759

(22) PCT Filed: Sep. 27, 2016

(86) PCT No.: PCT/JP2016/078511
§ 371 (c)(1),
(2) Date: Aug. 25, 2017

(87) PCT Pub. No.: WO2018/061096
PCT Pub. Date: Apr. 5, 2018

(65) Prior Publication Data
US 2018/0239327 A1    Aug. 23, 2018

(51) Int. Cl.
*G05B 19/19*    (2006.01)
*F16H 49/00*    (2006.01)
(52) U.S. Cl.
CPC ............ *G05B 19/19* (2013.01); *F16H 49/001* (2013.01); *G05B 2219/42005* (2013.01)

(58) Field of Classification Search
CPC . G05B 19/19; G05B 2219/42005; F16H 1/32; F16H 49/001; G05D 3/12
(Continued)

(56) References Cited

U.S. PATENT DOCUMENTS 5,301,101 A * 4/1994 MacArthur .......... G05B 13/026
                                                    360/75
5,952,804 A * 9/1999 Hamamura .......... G05B 19/237
                                                    318/560
(Continued)

FOREIGN PATENT DOCUMENTS

JP    5207071 B2    6/2013
JP    5453606 B2    3/2014
(Continued)

OTHER PUBLICATIONS

International Search Report (PCT/ISA/210) dated Dec. 6, 2016, by the Japanese Patent Office as the International Searching Authority for International Application No. PCT/JP2016/078511.
(Continued)

*Primary Examiner* — Jorge L Carrasquillo
*Assistant Examiner* — Devon A Joseph
(74) *Attorney, Agent, or Firm* — Buchanan Ingersoll & Rooney PC

(57) ABSTRACT

A positioning control device of an actuator provided with a strain wave gearing has a full-closed control system for feeding back a position of a load shaft, and driving and controlling a motor so as to position the load shaft at a target position. The full-closed control system has an H∞ compensator designed so that, when a generalized plant having angular transmission error in the strain wave gearing as a disturbance input is assumed, an H∞ norm of a transfer function from the disturbance input of the generalized plant to an evaluation output is a predetermined value or less.
(Continued)

Mechanical vibration during positioning response caused by angular transmission error in the strain wave gearing can be reliably suppressed.

1 Claim, 13 Drawing Sheets

(58) Field of Classification Search
USPC .......................................................... 318/611
See application file for complete search history.

(56) References Cited

U.S. PATENT DOCUMENTS

| | | | | |
|---|---|---|---|---|
| 9,804,584 B2* | 10/2017 | Eguchi | .................... | G05B 19/19 |
| 2010/0268354 A1* | 10/2010 | Takaishi | ............... | G11B 5/5582 |
| | | | | 700/37 |
| 2011/0054820 A1* | 3/2011 | Sasaki | ................. | G05B 19/404 |
| | | | | 702/94 |
| 2011/0248661 A1* | 10/2011 | Okitsu | .................... | G05D 3/10 |
| | | | | 318/632 |
| 2011/0251722 A1 | 10/2011 | Okitsu et al. | | |
| 2012/0271459 A1* | 10/2012 | Okitsu | ................. | G05B 13/041 |
| | | | | 700/275 |
| 2014/0203752 A1 | 7/2014 | Yamamoto et al. | | |

FOREIGN PATENT DOCUMENTS

| | | |
|---|---|---|
| JP | 5574228 B2 | 8/2014 |
| JP | 5656193 B2 | 1/2015 |
| JP | 5839510 B2 | 1/2016 |

OTHER PUBLICATIONS

Written Opinion (PCT/ISA/237) dated Dec. 6, 2016, by the Japanese Patent Office as the International Searching Authority for International Application No. PCT/JP2016/078511.

* cited by examiner

FIG. 7(a) LOAD VELOCITY RESPONSE
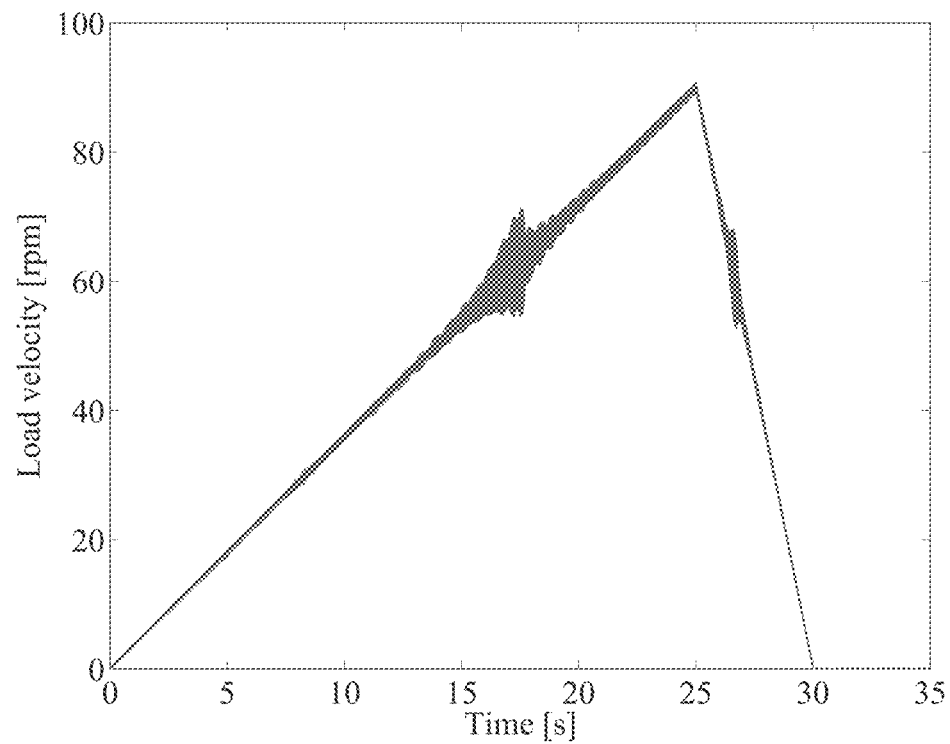
FIG. 7(b) LOAD POSITION VIBRATION COMPONENT
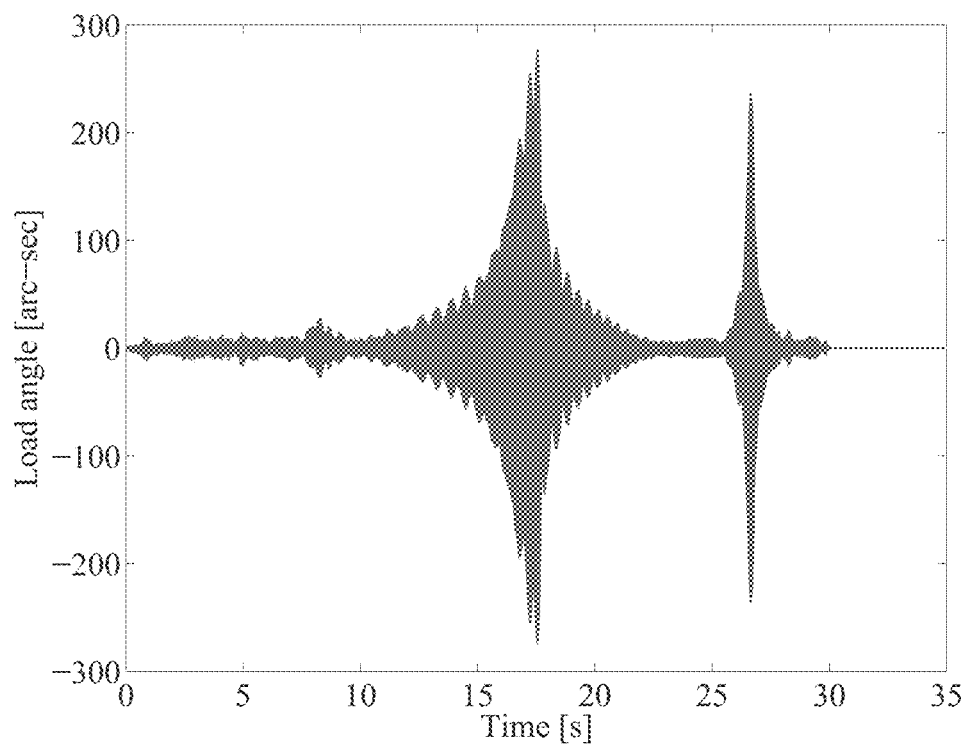

FIG. 9(a) SENSITIVITY FUNCTION
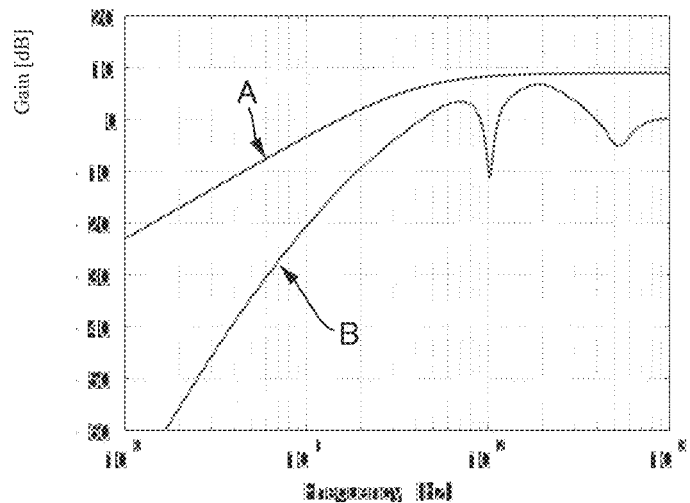
FIG. 9(b) CLOSED-LOOP CHARACTERISTIC
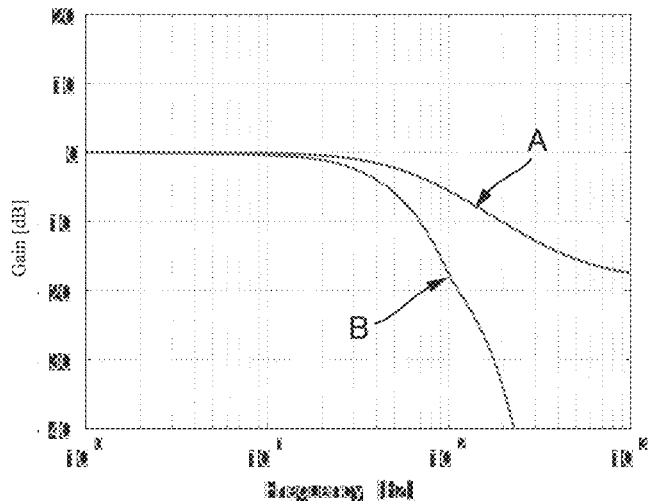
FIG. 9(c) CHARACTERISTIC FROM ANGULAR TRANSMISSION TO LOAD POSITION
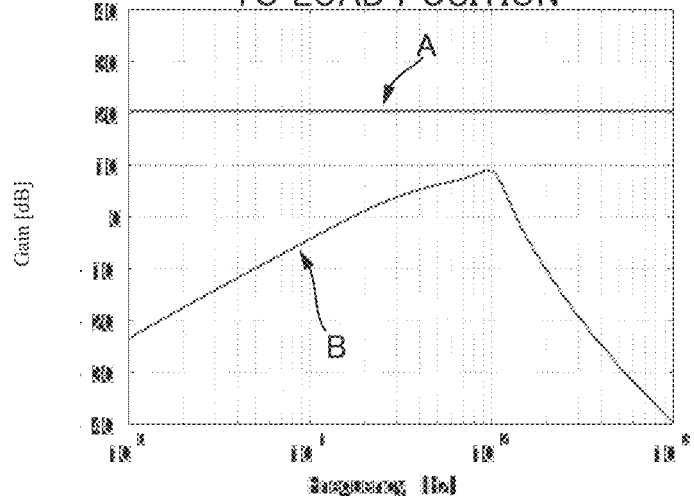

FIG. 10(a) FREQUENCY CHARACTERISTIC OF $K_1(s)$
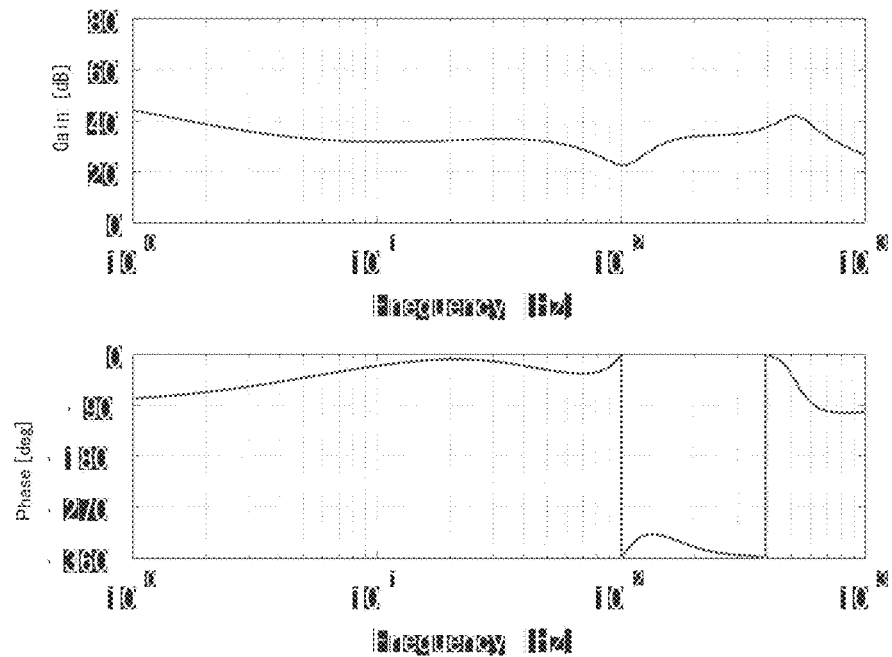
FIG. 10(b) FREQUENCY CHARACTERISTIC OF $K_2(s)$
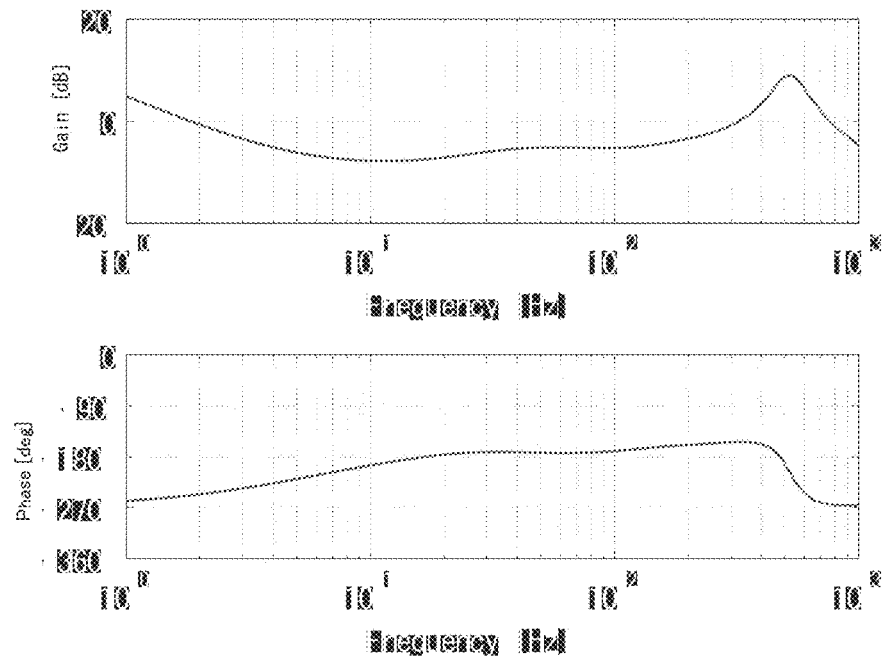

FIG. 11(a) SENSITIVITY FUNCTION
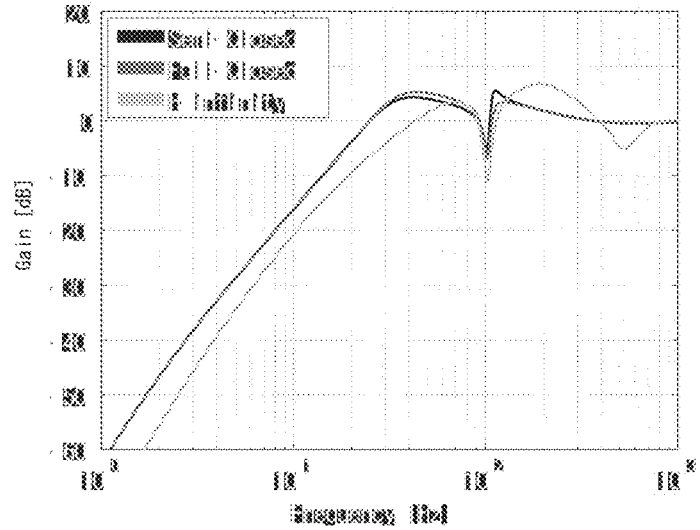
FIG. 11(b) CLOSED-LOOP CHARACTERISTIC
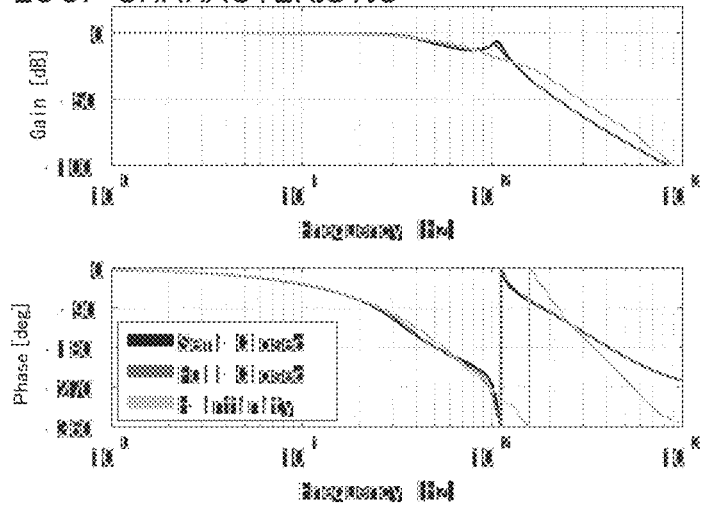
FIG. 11(c) CHARACTERISTIC FROM ANGULAR TRANSMISSION ERROR TO LOAD POSITION
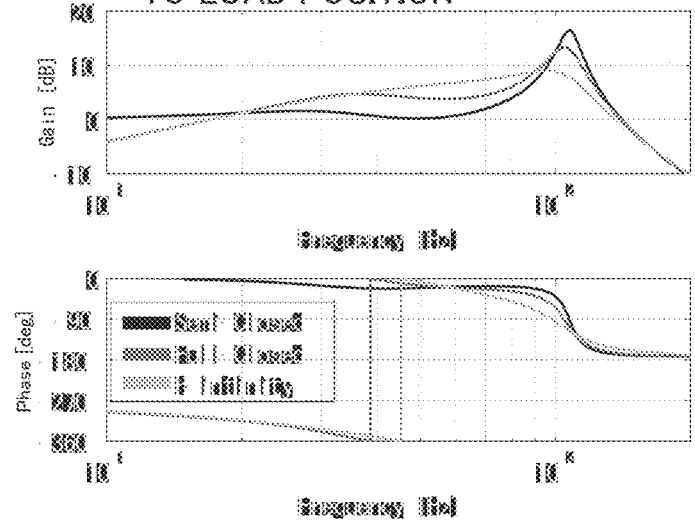

FIG. 12(a) LOAD VELOCITY RESPONSE
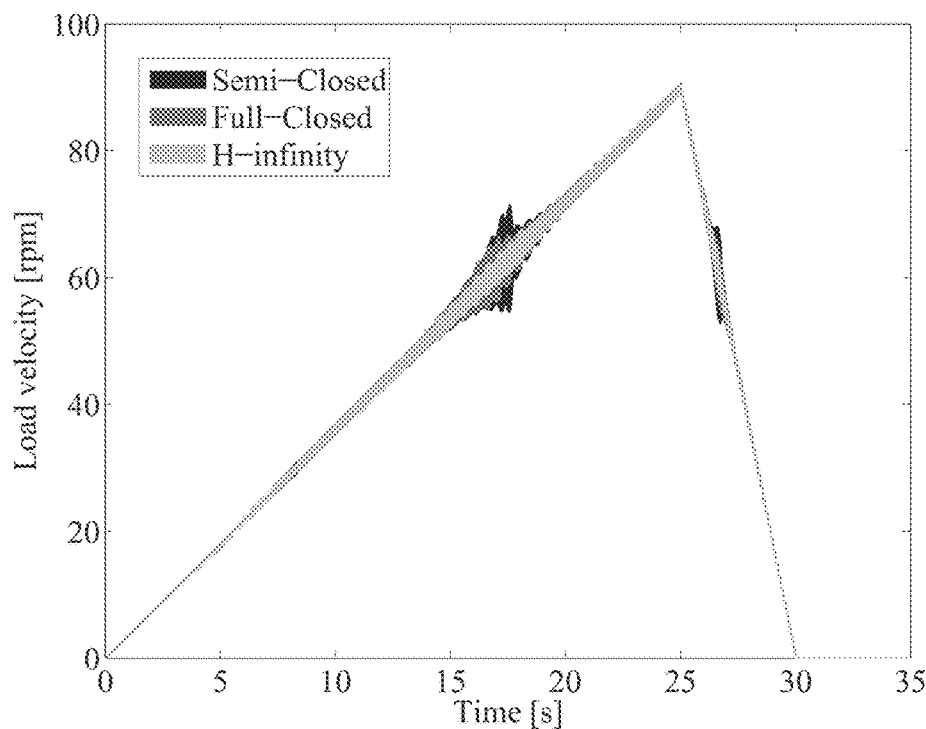
FIG. 12(b) LOAD POSITION VIBRATION COMPONENT
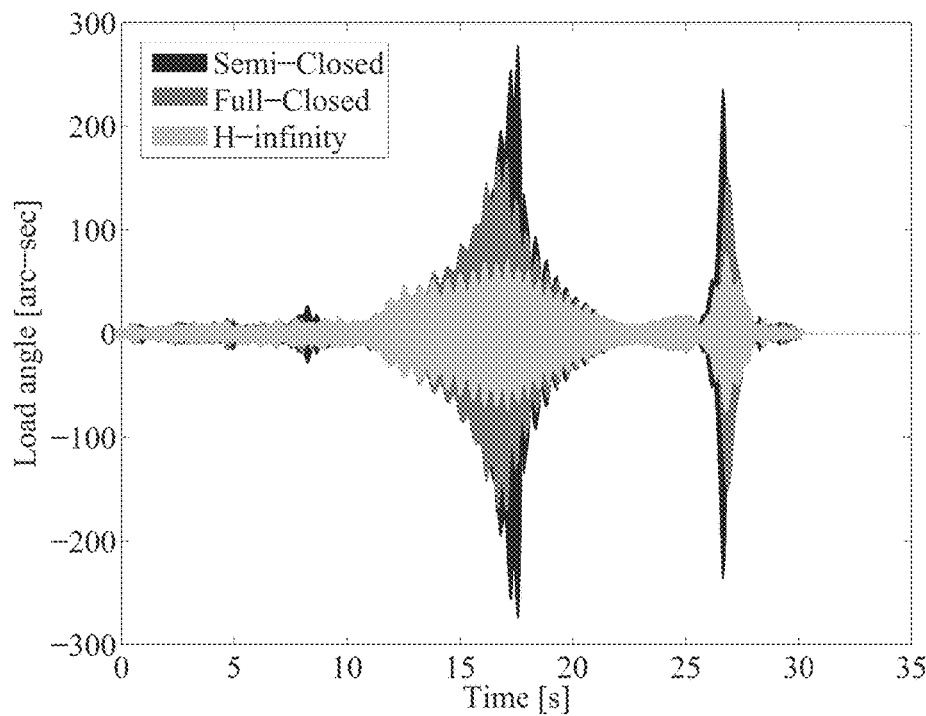

LOAD POSITION SETTLING VICINITY

LOAD VELOCITY RESPONSE

LOAD ACCELERATION RESPONSE

LOAD ACCELERATION SPECTRUM

POSITIONING CONTROL DEVICE OF ACTUATOR PROVIDED WITH STRAIN WAVE GEARING USING H-∞ CONTROL

TECHNICAL FIELD

The present invention relates to a positioning control device of an actuator having a configuration in which rotation output of a motor is reduced by a strain wave gearing and transmitted to a load shaft. More specifically, the present invention relates to a positioning control device for suppressing mechanical vibrations caused by angular transmission errors in a strain wave gearing by employing a full-closed control system using H∞ control, the positioning control device performing positioning control that has excellent stability, tracking, and damping.

BACKGROUND ART

Actuators provided with a motor and a strain wave gearing as a reduction mechanism are well-known. There are numerous control systems for actuators having this configuration to which is applied a semi-closed control system for performing control using only information concerning a motor shaft, and not using information concerning a load shaft, which is the output shaft of the strain wave gearing. In this case, angular transmission errors in the strain wave gearing that include hysteresis properties impede the performance of high-velocity and high-accuracy positioning control. The present inventors have therefore proposed methods for compensating for angular transmission errors using a model that has been analyzed, modeled, and constructed for angular transmission error (Patent Documents 1 to 4).

However, in an actuator in which a strain wave gearing is used as a reduction mechanism, a full-closed control system for controlling the position of a load shaft using both motor shaft information and load shaft information is also well-known. The present inventors have proposed a method for preventing degradation in positioning control performance of the load shaft caused by nonlinear characteristics of the strain wave gearing in such a control device (Patent Document 5).

PRIOR ART DOCUMENTS

Patent Documents

Patent Document 1: Japanese Patent No. 5453606
Patent Document 2: Japanese Patent No. 5574228
Patent Document 3: Japanese Patent No. 5207071
Patent Document 4: Japanese Patent No. 5839510
Patent Document 5: Japanese Patent No. 5656193

SUMMARY OF THE INVENTION

Problems to be Solved by the Invention

Although control performance can be improved in a case where a full-closed control system is employed in an actuator provided with a strain wave gearing, numerous problems are encountered, such as the space required to install sensors and the increase in cost. It is thought, however, that the utilization of full-closed control systems will also increase in light of lowered sensor costs and further improvements in performance.

With the foregoing issues in view, it is an object of the present invention to provide a positioning control device of an actuator provided with a strain wave gearing, configured so that mechanical vibrations during positioning response caused by angular transmission errors in the strain wave gearing can be suppressed using a full-closed control system based on an H∞ control system design.

Means of Solving the Problems

According to the present invention, there is provided a positioning control device of an actuator provided with a strain wave gearing, in which an actuator provided with a configuration in which rotation of a motor is reduced by the strain wave gearing and transmitted to a load shaft is driven and controlled, and positioning control for the load shaft is performed, the positioning control device comprising:

a full-closed control system for feeding back a position of the load shaft and driving and controlling the motor so that the load shaft is positioned at a target position;

wherein the full-closed control system has an H∞ compensator designed so that when a generalized plant that has, as a disturbance input, angular transmission errors generated synchronously with relative rotation of constituent components of the strain wave gearing is assumed to be the actuator to be controlled, an H∞ norm of a transfer function from the disturbance input of the generalized plant to an evaluation output becomes a predetermined value or less; and the H∞ compensator controls a drive current flowing to the motor.

The control performance required in a full-closed control system has three control system features: stability, tracking, and damping. Accordingly, examples of design guidelines for an H∞ control system include: setting a gain characteristic of a sensitivity function to a predetermined level or less in order to ensure stability; configuring a servo system for a load position in order to ensure tracking; setting a gain characteristic of a closed-loop characteristic to a predetermined level or less, and having a predetermined critical frequency in order to ensure tracking and damping; and setting a gain characteristic from angular transmission error to a load position to a predetermined level or less in order to ensure damping. An H∞ compensator can be designed so as to allow construction of a control system that will ensure the design guidelines are satisfied.

The influence of phase lag caused by dynamics from a motor to a load is felt in position feedback for configuring a servo system for a load position, and the feedback system easily loses stability. In view thereof, a full-closed control system preferably provides feedback of a motor velocity to the H∞ compensator in addition to the load shaft position in order to improve stability in the control system and expand the bandwidth of the servo.

BRIEF DESCRIPTION OF THE DRAWINGS

FIGS. 7(a) and 7(b) are graphs showing response results of a constant acceleration test;

FIGS. 9(a)-9(c) are graphs showing a weighting function and various characteristics;

FIGS. 10(a) and 10(b) are graphs showing frequency characteristics of a compensator;

FIGS. 11(a)-11(c) are graphs showing frequency characteristics of respective control systems;

FIGS. 12(a) and 12(b) are graphs showing results of a low-acceleration test.

MODE FOR CARRYING OUT THE INVENTION

A positioning control device of an actuator provided with a strain wave gearing according to the present invention will now be described with reference to the accompanying drawings.

[Overall Configuration of Positioning System]

Figure 1:
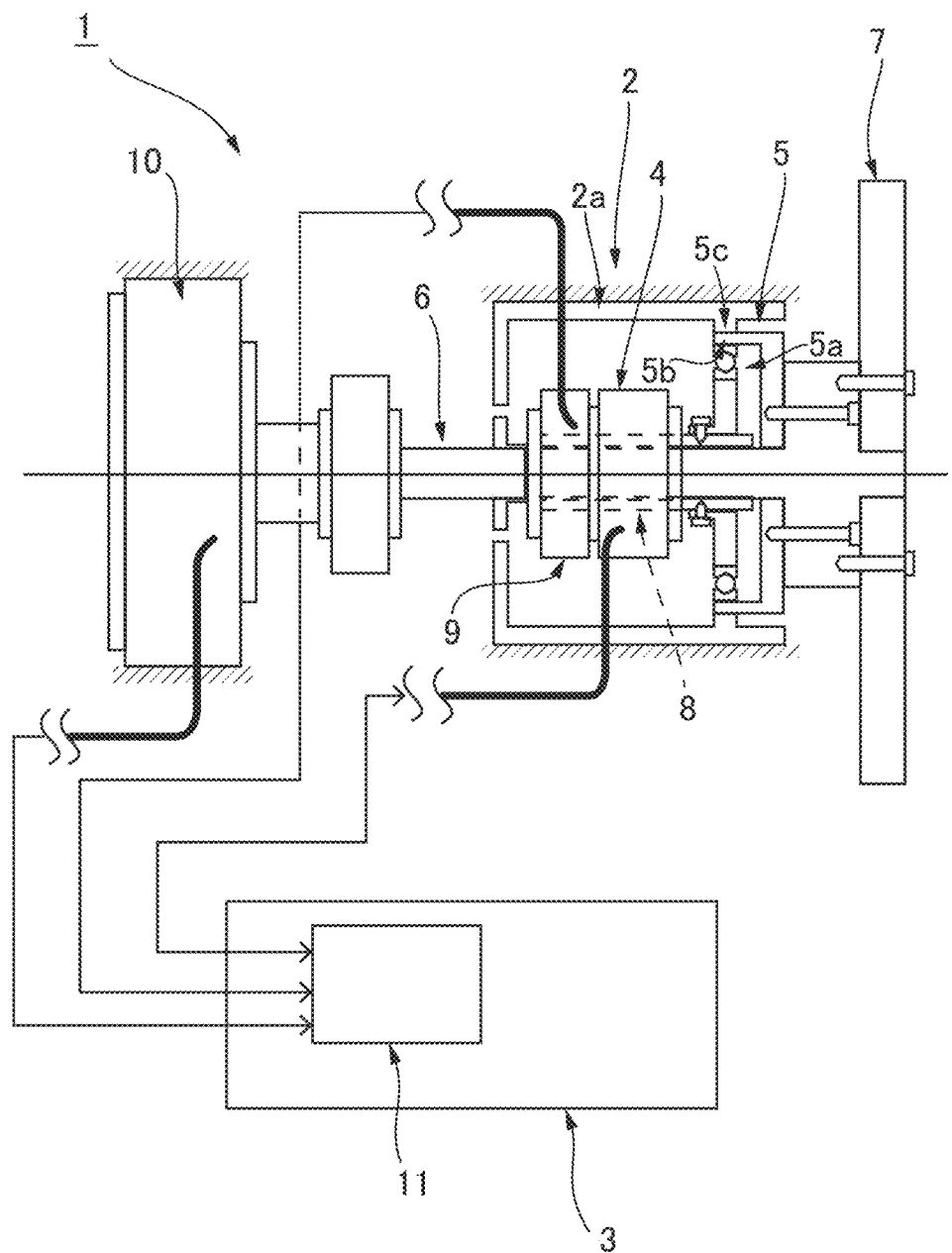
FIG. 1 shows an example of a configuration of a positioning system of the present invention.

FIG. 1 is an explanatory view showing an example of a configuration of a positioning system provided with an actuator that includes a strain wave gearing as a reduction gear, the actuator being the object of control of the present invention. A positioning system 1 is provided with an actuator 2 and a positioning control device 3. The actuator 2 is provided with a motor 4, a strain wave gearing 5 for reducing output rotation of the motor 4, and a load shaft 6 for rotating according to the reduced rotation outputted by the strain wave gearing 5. A load device 7 attached to the load shaft 6 is driven in a rotating manner by the actuator 2. The strain wave gearing 5 is provided with a wave generator 5a fixed to a motor shaft 8, a flexible externally toothed gear 5b fixed to the load shaft 6, and a rigid internally toothed gear 5c fixed to an actuator housing 2a. A motor shaft encoder 9 for detecting a motor shaft position is attached to the motor shaft 8 of the motor 4, and a load shaft encoder 10 for detecting the load shaft position is attached to the load shaft 6.

The positioning control device 3 is provided with a full-closed control system for controlling the driving of the motor 4 and performing positioning of the load shaft 6 (and therefore the load device 7) on the basis of load shaft position information detected by the load shaft encoder 10 and motor shaft position information detected by the motor shaft encoder 9. An H∞ compensator 11 is used for feedback control.

[Angular Transmission Error in Strain Wave Gearing]

Where $\theta_m$ is a motor shaft position, $\theta_1$ is a load shaft position, and N is a reduction ratio, angular transmission error $\theta_{TE}$ in the strain wave gearing 5 is the difference between a theoretical load shaft position $\theta_m/N$ calculated from the motor shaft position $\theta_m$ and an actual load shaft position $\theta_1$. The angular transmission error $\theta_{TE}$ of the strain wave gearing 5 is defined in the following equation 1.

$$\theta_{TE} = \theta_1 - \theta_m/N \quad \text{(Equation 1)}$$

Angular transmission error in the strain wave gearing 5 occurs due to machining error in gears or assembling error in constituent parts, and is synchronized with relative rotation of the constituent parts. The angular transmission error can be measured as follows. The positioning of a very small feed angle is performed for one load shaft rotation in which gear meshing completes one cycle, and the angular transmission error when the positioning is completed is measured for every positioning.

Figure 2:
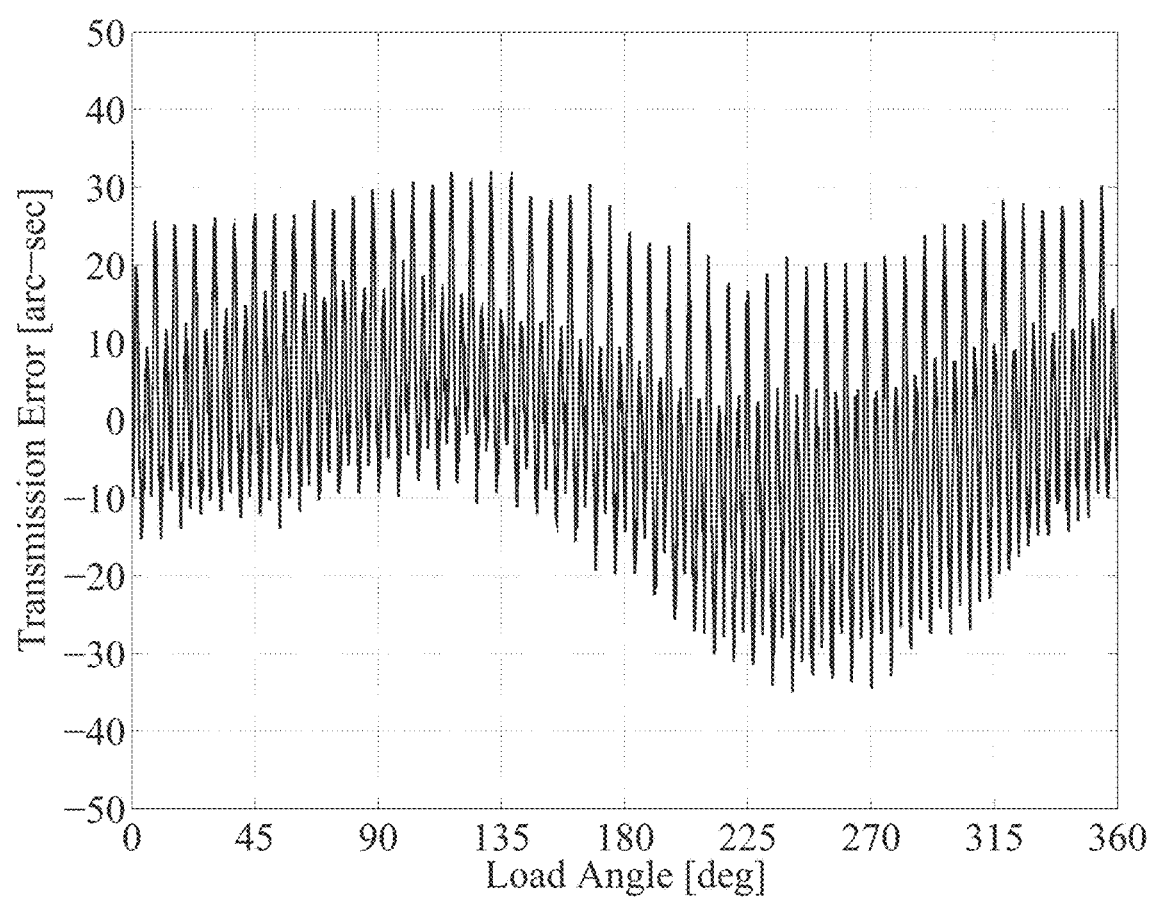
FIG. 2 is a graph showing measurement results of angular transmission errors for one rotation of a load shaft.
Figure 3:
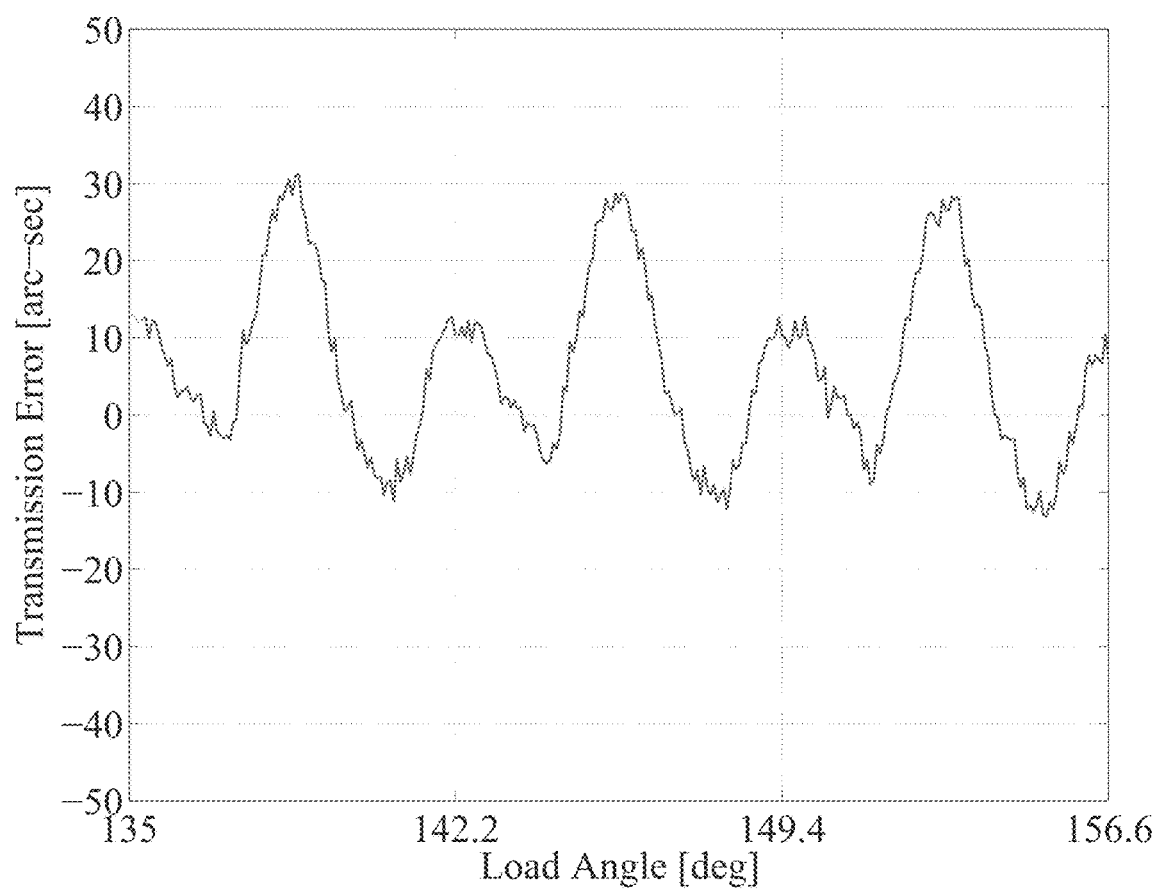
FIG. 3 is a graph showing measurement results of angular transmission error for three periods of a motor shaft.
Figure 4:
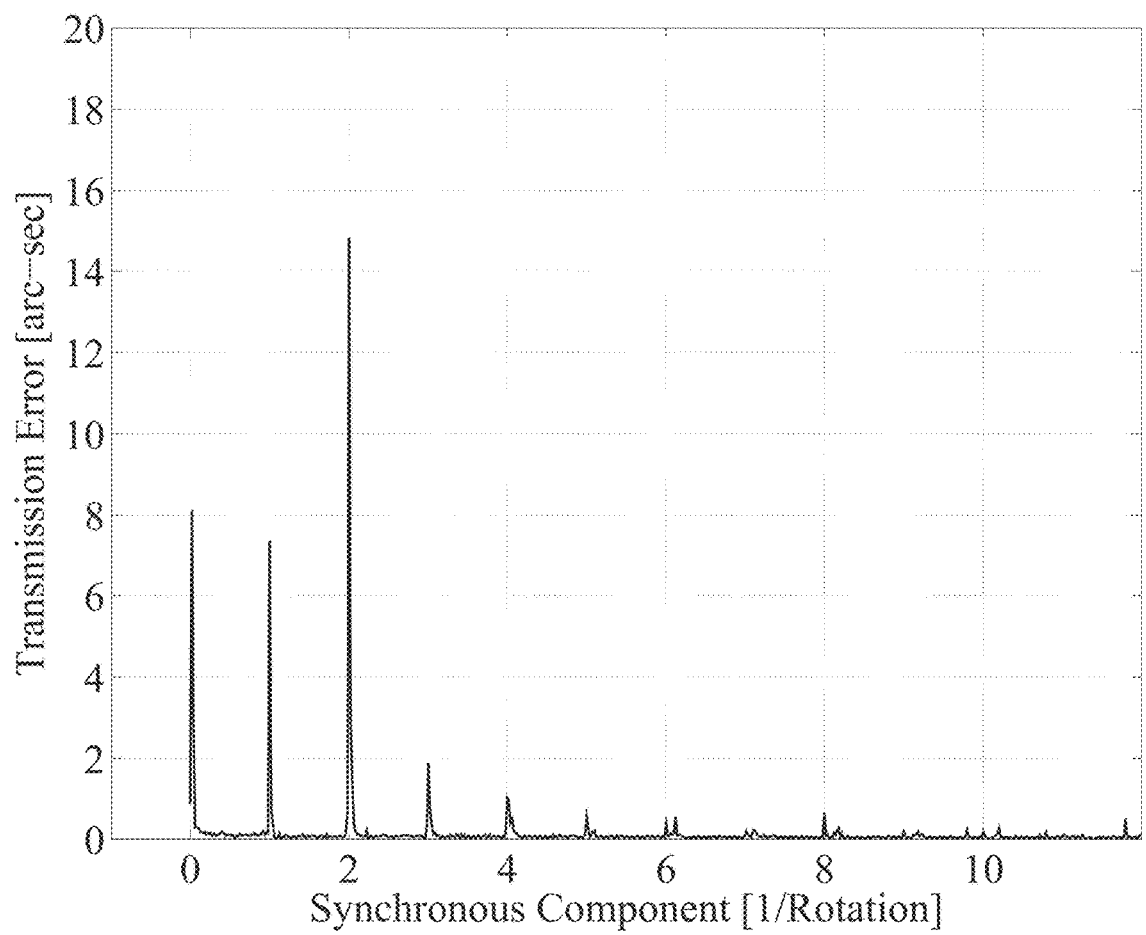
FIG. 4 is a graph showing spectral analysis results of measurement results of angular transmission error.

FIG. 2 is a graph showing measurement results of angular transmission error for one rotation of a load shaft, FIG. 3 is a graph showing measurement results for three rotations of a motor shaft, and FIG. 4 is a graph showing spectral analysis results of the measurement results. The horizontal axis in FIG. 4 normalizes motor rotation. A periodic component can be confirmed from FIGS. 2 and 3. It can be confirmed from FIG. 4 that in angular transmission error, frequency components that are twice the size of the motor rotation period, in particular, are the main components.

[Analysis of Vibration Caused by Angular Transmission Error]

It is well known that when the frequency of angular transmission error and the mechanical resonance frequency match, resonant vibration is excited during acceleration and deceleration, and mechanical vibration and noise are generated.

Figure 5:
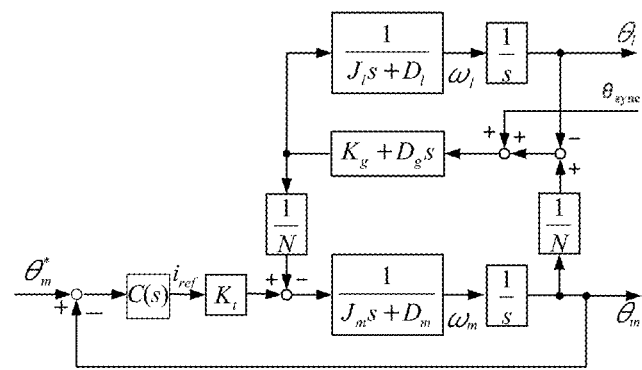
FIG. 5 is block diagram showing a semi-closed control system in a case where the actuator of FIG. 1 is considered as a dual inertial system model.

FIG. 5 is a block diagram showing a semi-closed control system in a case where the actuator 2 of the positioning system 1, which is the object of control of the present invention, is considered as a dual inertial system model. The actuator 2 is typically handled as a dual inertial system model comprising a motor-side inertial system that includes a motor shaft on the input side of the strain wave gearing and a load-side inertial system that includes a load shaft on the output side of the strain wave gearing. The reference labels in the drawing are as follows. C(s) represents a P-PI compensator for feeding back the motor position and the velocity, and the aforedescribed angular transmission error is a position disturbance $\Theta_{sync}$ in the drawing.

Figure 6:
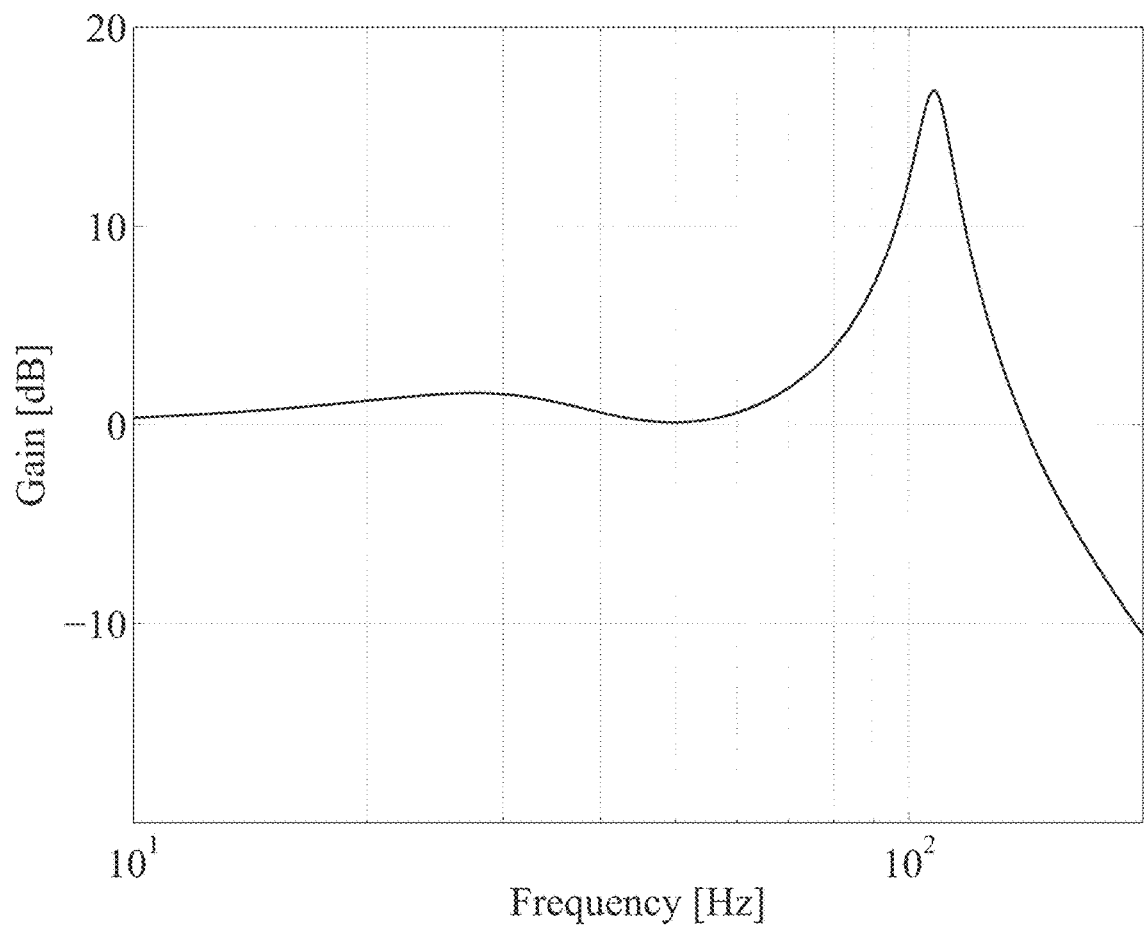
FIG. 6 is a graph showing a frequency characteristic from angular transmission error to a load position.

$J_m$: Motor shaft inertial moment
$D_m$: Motor shaft viscosity coefficient of friction
$J_l$: Load shaft inertial moment
$D_l$: Load shaft viscosity coefficient of friction
$D_g$: Viscosity coefficient of friction for reduction gear
N: Reduction ratio
$K_t$: Motor torque constant
$\Theta_m$: Motor shaft position
$\Theta_m\text{dot}(\omega m)$: Motor velocity
$\Theta_l$: Load shaft position
$\omega_1$: Load velocity
$\Theta_{sync}$: Angular transmission error
$i_{ref}$: Motor torque current command value
$\Theta^*_m$: Position command input FIG. 6 is a graph showing a frequency characteristic from the angular transmission error $\Theta_{sync}$ to the load shaft position $\Theta_l$. It is understood from FIG. 6 that a transmission characteristic $G_l$ has a resonance characteristic in the vicinity of 100 Hz, and vibrations are excited at the load shaft position when a component at 100 Hz is inputted to the angular transmission error $\Theta_{sync}$.

FIG. 7 is a graph showing results from the performance of a constant acceleration test in order to analyze the vibration phenomenon caused by the angular transmission error $\Theta_{sync}$. FIG. 7(a) shows the load velocity response, and FIG. 7(b) shows the load position vibration component. FIG. 7 particularly shows the vibrational response when the load velocity is in the vicinity of 60 rpm. In the constant acceleration test, the motor velocity when the frequency of the angular transmission error is 100 Hz is 3000 rpm, and the reduction ratio N of the strain wave gearing 5 of the positioning system 1 is 50, and the load velocity is therefore 60 rpm. Accordingly, this vibration phenomenon is caused by the angular transmission error.

[Design of H∞ Control System]

(Design Guidelines for H∞ Control System)

The control performance required for a feedback system for the actuator 2 of the positioning system 1, the actuator being the object of control, includes three control system features: stability, tracking, and damping. The guidelines for the characteristics thereof in a frequency region are set up and evaluated. The design guidelines in this example are applied as follows.

(1) The gain characteristic of a sensitivity function is 10 dB or less (stability)
(2) Configure a servo system for a load position (tracking)
(3) The gain characteristic of a closed-loop characteristic is 0 dB or less, and the critical frequency is approximately 30 Hz (tracking/damping)
(4) The gain characteristic from the angular transmission error to the load position is 10 dB or less (damping)

(H∞ Compensator)

Figure 8:
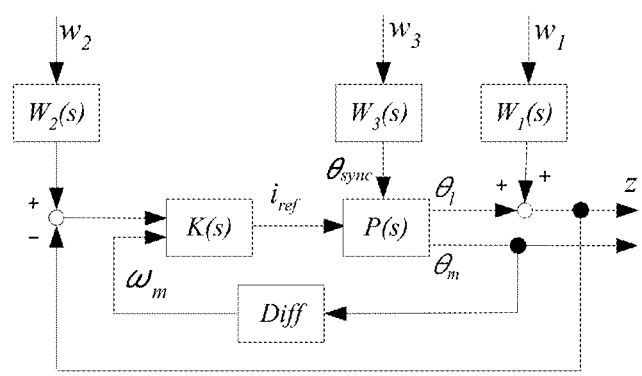
FIG. 8 is a block diagram showing a generalized plant.

The H∞ compensator is designed using the generalized plant shown in FIG. 8 in order to design a control system so as to satisfy the design guidelines described above. The reference labels in FIG. 8 are as follows.

$w_1$ to $w_3$: Disturbance input
$W_1(s)$, $W_2(s)$, $W_3(s)$: Weighting function
$K(s)$: H∞ compensator
$P(s)$: Numerical model for object of control (actuator)
Diff: Differentiator
z: Evaluation output
$\Theta_{sync}$: Angular transmission error
$\Theta_m$: Motor shaft position
$\Theta_l$: Load shaft position
$i_{ref}$: Current command
$\omega_m$: Motor shaft velocity A full-closed control system is configured in the present invention as described above, but the influence of phase lag caused by dynamics from the motor to the load shaft is felt in load shaft position feedback for configuring the servo for the load shaft position, and the feedback system is easily made unstable. In view thereof, motor velocity information ($\omega_m$) is added to the feedback in order to improve stability in the control system and expand the bandwidth of the servo.

In the generalized plant shown in FIG. 8, the relationship between disturbance inputs $w_1$ to $w_3$ to the evaluation output z is represented in the following equation 2, where a sensitivity coefficient is S(s), a closed-loop characteristic is $G_c(s)$, and a characteristic from angular transmission error to a load position is $G_l(s)$.

$$z = \begin{bmatrix} W_1(s) \cdot S(s) & 0 & 0 \\ 0 & W_2(s) \cdot G_c(s) & 0 \\ 0 & 0 & W_3(s) \cdot G_l(s) \end{bmatrix} \begin{bmatrix} w_1 \\ w_2 \\ w_3 \end{bmatrix} \quad \text{(Equation 2)}$$

Here, each weighting function corresponds to the aforementioned design guidelines, the H∞ compensator may be derived on the basis of equation 2, and each characteristic can be frequency-shaped so that the following equations 3, 4, and 5 are satisfied by all of the frequency bandwidths. In the present example, an approximate integrator is included in $W_1(s)$ in order to realize a servo system.

$$S(s) < \gamma/W_1(s) \quad \text{(Equation 3)}$$

$$G_c(s) < \gamma/W_2(s) \quad \text{(Equation 4)}$$

$$G_l(s) < \gamma/W_3(s) \quad \text{(Equation 5)}$$

In FIG. 9 a reverse characteristic of the weighting functions of $W_1(s)$ to $W_3(s)$ is shown by the curved line A, and each of the characteristics are shown by the curved line B. In FIG. 10, the frequency characteristic of the derived H∞ compensator is shown using the generalized plant and the weighting functions $W_1(s)$ to $W_3(s)$ of FIG. 8.

As shown in the relationships in equations 3 to 5, it is understood from FIG. 9 that frequency shaping is performed so that the curved line A covers the curved line B. For the gain characteristic being 10 dB or less, which is the design guideline, the weighting function is not directly set in the characteristic from the angular transmission error to the load shaft position in FIG. 9(c). This is because an H∞ compensator that satisfied all of the design guidelines could not be derived in a case where the weighting functions $W_1(s)$ to $W_3(s)$ were directly set to 10 dB, and the design guidelines (1) to (3) were prioritized.

The following describes a derived compensator K(s). The relationship between the compensator K(s) and a current command value $i_{ref}$ is shown in the following equation 6.

$$i_{ref} = K(s) \begin{bmatrix} \theta_l^* - \theta_l \\ \omega_m \end{bmatrix} \quad \text{(Equation 6)}$$

$$= \begin{bmatrix} K_1(s) & 0 \\ 0 & K_2(s) \end{bmatrix} \begin{bmatrix} \theta_l^* - \theta_l \\ \omega_m \end{bmatrix}$$

FIG. 10 shows the frequency characteristic of the compensator K(s). An integral characteristic having an inclination of −20 dB/dec is formed on the low-frequency side, and it can be confirmed that a servo system is constituted. In addition, a phase advance characteristic is formed from the characteristic of $K_2(s)$ in the vicinity of 100 Hz, which is the mechanical resonance frequency, contributing to stabilization of the control system. The compensator is an $11^{th}$ order compensator, for both $K_1(s)$ and $K_2(s)$.

[Comparison in Frequency Characteristic Between Prior-Art Controls and H∞ Control System]

A comparative examination was performed between the H∞ control system designed as described above, and a prior-art P-PI semi-closed control system and a P-PI full-closed control system. FIG. 11 is a graph showing a comparison of a sensitivity function, a closed-loop characteristic, and a frequency characteristic from angular transmission error to a load position. In the drawings, the semi-closed control system is shown by the curved line labeled as "Semi-Closed," the full-closed control system is shown by the curved line labeled as "Full-Closed," and the H∞ control system is shown by the curved line labeled as "H-infinity." The semi-closed control system and the full-closed control system are designed having approximately the same stability, with consideration for the aforementioned design guidelines (1) to (3) for the H∞ control system, and are designed in consideration of vibration caused by angular transmission error.

From FIG. 11(a), it can be confirmed that lower sensitivity is obtained at lower frequencies in the H∞ control system relative to the P-PI semi-closed control system and the P-PI full-closed control system. In addition, it can be confirmed from a closed-loop characteristic in FIG. 11(b) that broader bandwidth and decrease in phase lag are obtained. Moreover, it can be confirmed from 11(c) that peak gain in the vicinity of 100 Hz of the characteristic from the angular transmission error to the load shaft position is suppressed, and an effect of suppressing vibrations caused by the angular transmission error is obtained.

[Verification of Effectiveness of H∞ Control System by Performing Experiments on Actual Equipment]

The effectiveness of an H∞ control system was verified by a drive experiment involving the positioning system shown in FIG. 1. A response comparison was performed with the aforedescribed P-PI semi-closed control system and the P-PI full-closed control system. In terms of the experiment using actual equipment, a low-acceleration experiment in which the influence of vibrations caused by angular transmission error are prominent was carried out in order to evaluate damping, and a high-acceleration experiment was carried out in order to evaluate high-velocity/high-accuracy positioning as tracking evaluation.

[Verification by Low-Acceleration Experiment]

A low-acceleration experiment, in which the influence of vibrations caused by angular transmission error is prominent, was carried out, and the load position vibration component was evaluated.

FIGS. 12(a) and 12(b) are graphs showing a load velocity response and a load position vibration component. In the drawings, the semi-closed control system is shown by the curved line labeled as "Semi-Closed," the full-closed control system is shown by the curved line labeled as "Full-Closed," and the response in the H∞ control system is shown by the curved line labeled as "H-infinity" The results of five tests in each of the control systems are superposed and shown.

On the basis of FIG. 12, vibrations are excited on the load shaft when the drive velocity is in the vicinity of 60 rpm by the influence of the angular transmission error in the semi-closed control system, as in the aforementioned. In addition, although vibration can be suppressed in the full-closed control system to a greater extent than in the semi-closed control system, a sufficient effect of suppressing vibrations is not obtained, and the results correspond to the characteristic in FIG. 11(c).

On the other hand, vibration can be suppressed in the H∞ control system to a greater effect than in the prior-art P-PI control systems. As a quantitative evaluation, the maximum amplitude and the vibration area of the load position vibration component is shown in table 1. On the basis of table 1, the maximum amplitude was reduced by 27.5% and the vibration area was reduced by 64.2% in the H∞ control system relative to the prior-art semi-closed control system, and the effectiveness of the H∞ control system could be confirmed.

TABLE 1

(Effect of Suppressing Vibrations)

| | Semi-Closed | Full-Closed | H-infinity |
|---|---|---|---|
| Amplitude [arcsec (%)] | 252.8(100) | 162.3(64.2) | 69.5(27.5) |
| Area [arcsec × s (%)] | 372.4(100) | 346.1(92.9) | 238.9(64.2) |

(Verification by High-Acceleration Test)

The positioning response at a feed degree of 43.2° was evaluated as a high-acceleration test, in which high-velocity/high accuracy positioning occurs, as a tracking evaluation.

FIGS. 13(a) to 13(d) are graphs showing the vicinity of load position settling, load velocity response, load acceleration response, and load acceleration spectrum. In the drawings, the semi-closed control system is shown by the curved line labeled as "Semi-Closed," the full-closed control system is shown by the curved line labeled as "Full-Closed," and the H∞ control system is shown by the curved line labeled as "H-infinity." The results of five tests for each control system are superposed and displayed.

Figure 13A:
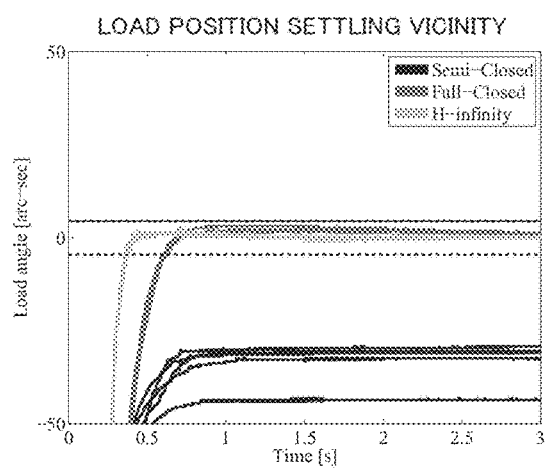
FIGS. 13(a)-13(d) are graphs showing results of a high-acceleration test.

From FIG. 13(a), it can be confirmed that a steady-state deviation occurs in the semi-closed control system due to the influence of angular transmission error. However, in the full-closed control system and in the H∞ control system, which is similarly a full-closed control system, it can be confirmed that there is convergence to a target value without steady-state deviation. In addition, it can also be confirmed that overshot is also reduced, settling time can be reduced, and response can be improved by about 1.6 times in the H∞ control system in comparison to prior-art control systems.

Figure 13B:
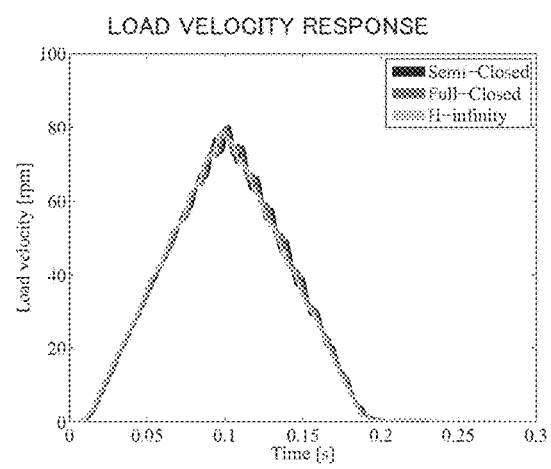
Figure 13C:
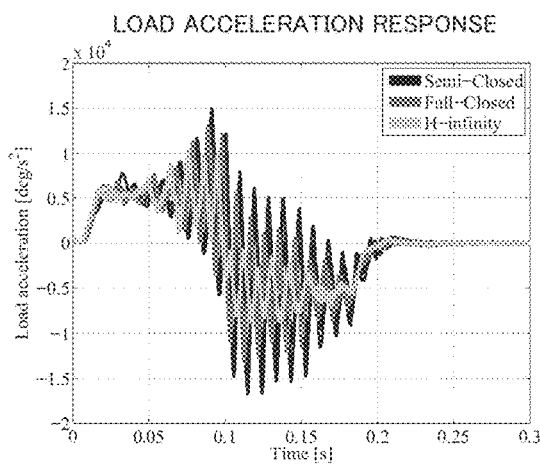
Figure 13D:
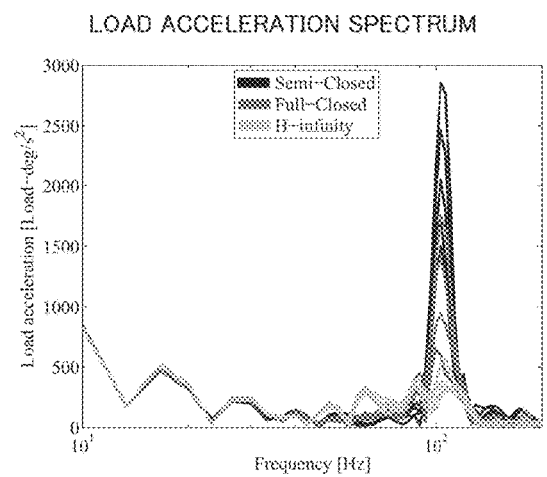

On the basis of the load velocity response and the load acceleration response in FIGS. 13(b) and 13(c), it can be confirmed that vibration during transient response can also be suppressed in the same way as in the low-acceleration experiment. In particular, FIG. 13(d) shows that the spectrum in the vicinity of 100 Hz is greatly reduced, and vibration caused by angular transmission error can be suppressed.

The invention claimed is:

1. A positioning control device of an actuator provided with a strain wave gearing, in which the actuator provided with a configuration in which rotation of a motor is reduced by the strain wave gearing and transmitted to a load shaft, is driven and controlled, and positioning control for the load shaft is performed, the positioning control device of the actuator provided with the strain wave gearing comprising:
a full-closed control system for feeding back a position of the load shaft and driving and controlling the motor so that the load shaft is positioned at a target position;
wherein the full-closed control system has an H∞ compensator designed so that, when a generalized plant that has, as a disturbance input, angular transmission error generated synchronously with relative rotation of constituent components of the strain wave gearing is assumed to be the actuator to be controlled, an H∞ norm of a transfer function from the disturbance input of the generalized plant to an evaluation output becomes a predetermined value or less; and
the H∞ compensator controls a drive current flowing to the motor;
wherein the full-closed control system feeds back a velocity of the motor to the H∞ compensator in addition to a position of the load shaft; and
wherein a relationship from disturbance inputs $w_1$ to $w_3$ to an evaluation output z is shown by $$z = \begin{bmatrix} W_1(s) \cdot S(s) & 0 & 0 \\ 0 & W_2(s) \cdot G_c(s) & 0 \\ 0 & 0 & W_3(s) \cdot G_l(s) \end{bmatrix} \begin{bmatrix} w_1 \\ w_2 \\ w_3 \end{bmatrix}$$

where, in the generalized plant, $w_1$, $w_2$, and $w_3$ are, respectively, a disturbance input on a load side, a disturbance input on an input side, and a disturbance input representing angular transmission error; $W_1(s)$, $W_2(s)$, $W_3(s)$ are frequency weighting transfer fucntions of the disturbance inputs; z is an evaluation output; S(s) is a sensitivity coefficient; $G_c(s)$ is a closed-loop characteristic; and $G_f(s)$ is a characteristic from angular transmission error to a position of the load shaft; and
the H∞ compensator is designed so that the sensitivity coefficient S(s), the closed-loop characteristic Gc(s), and the characteristic $G_f(s)$ from the angular transmission error to the position of the load shaft satisfy, for all frequency bandwidths, $S(s) < \gamma/W_1(s)$ $G_c(s) < \gamma/W_2(s)$ $G_I(s) < \gamma/W_3(s)$ where $\gamma$ is a predetermined value set in advance.

* * * * *